Nov. 18, 1930.    L. H. TAYLOR    1,782,079
COVER FOR COOKING UTENSILS
Filed Aug. 13, 1929
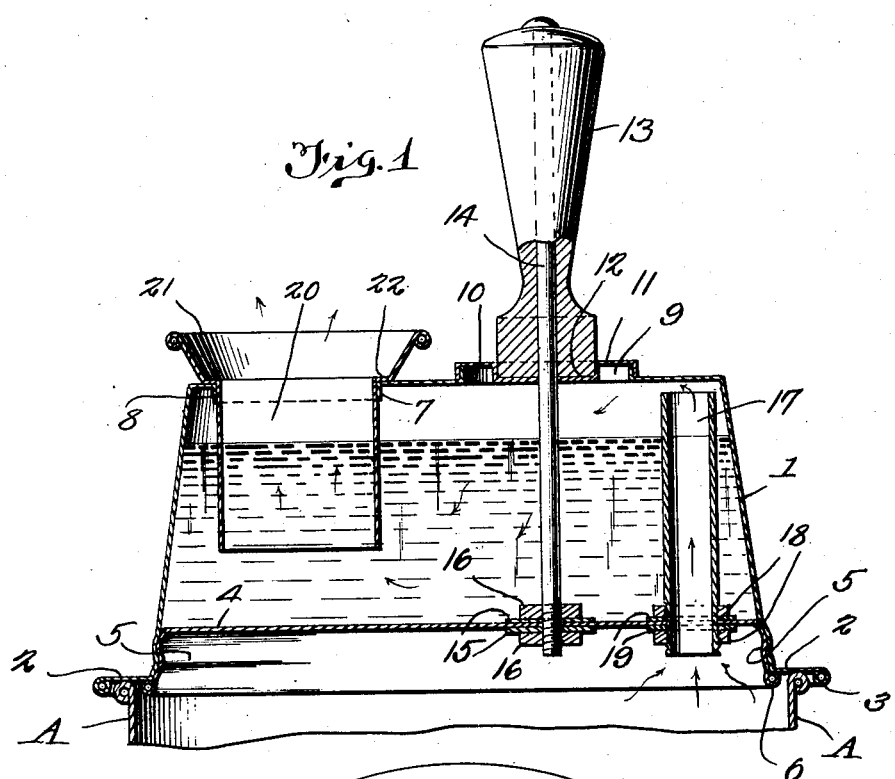
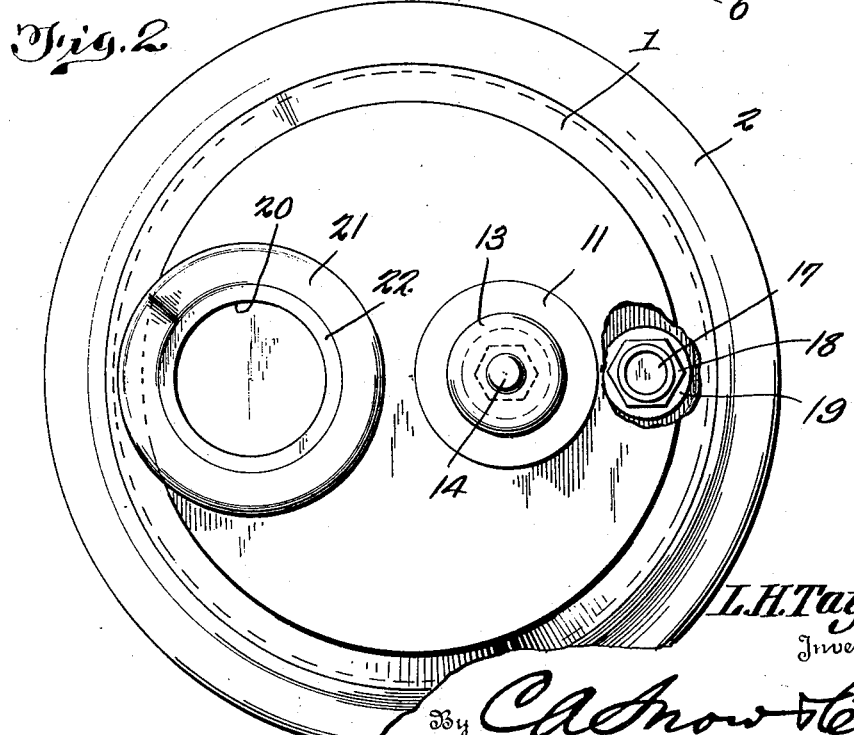
L. H. Taylor
Inventor Patented Nov. 18, 1930

1,782,079

UNITED STATES PATENT OFFICE

LAWRENCE HENRY TAYLOR, OF IOLA, KANSAS

COVER FOR COOKING UTENSILS

Application filed August 13, 1929. Serial No. 385,564.

This invention relates to a cover for cooking utensils, one of the objects being to provide an efficient and simple device of this character which, when placed in position on a cooking utensil, will act both as a condenser and a water heater.

Another object is to provide a cover the parts of which can be assembled easily, means being provided whereby access can be had readily to the interior of the cover for the purpose of cleaning it.

A further object is to provide a cover utilizing water as a condensing medium, this water also acting as a weight for holding the cover firmly on the utensil, thereby to prevent the escape of steam between the utensil and the cover.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a central vertical section through the cover, a portion of the utensil on which it is mounted being shown in section.

Figure 2 is a plan view of the cover, parts being broken away.

Referring to the figures by characters of reference, 1 designates the body portion of the cover which can be slightly tapered or frusto-conical as shown, if desired, this body being provided with an annular flange 2 along the outer margin of which is formed a bead 3. The bottom of the body is closed preferably by a disk 4 having a flange 5 extending downwardly therefrom and terminating in a bead 6 which is concentric with but spaced from the bead 3. The body 1 and flange 5 are preferably joined by crimping or rolling so as to provide a water-tight joint between these parts. Obviously the parts can be connected in any other manner desired although it is preferred to join them as explained.

In the top of the body 1 there is formed an opening 7 surrounded by a depending flange 8 and another opening 9 is formed in the top of the body, the same being surrounded by an upstanding flange 10.

Fitted around the flange 10 is a cap 11 having a central depression 12 in which is seated one end of a handle 13 formed of wood, composition, or any other suitable material. Through this handle is extended a tie bolt 14 the head of which rests on the outer end of the handle while the lower portion of the bolt is screw-threaded and is extended through the bottom disk 4. Washers 15 are mounted on the bolt in contact with the opposed faces of the disk 4 and are adapted to be clamped thereto by nuts 16 engaging the bolt. Obviously by providing this bolt the handle 13 will be held securely to its seat formed by recess 12, cap 11 will be held tightly on the top of cover 1, and the disk 4 will be tied securely to the body 1.

A steam outlet tube 17 open at both ends is seated at one end in the disk 4. This end portion of the tube 17 is exteriorly screw-threaded for engagement by nuts 18 located above and below the disk 4. Washers 19 are interposed between said disk and the nut and by tightening the nut the tube 17 is not only held securely to the disk but the washers are forced tightly into engagement with the disk so as to form a tight connection.

Seated tightly in the opening 7 where it frictionally engages the flange 8 is a water tube 20. This tube extends downwardly within body 1 and is provided, at its outer end, with a flared head 21 formed with an annular shoulder 22 adapted to bear firmly on the top of cover 1.

In practice water is poured through the tubes 20 into the body 1 until the level thereof is brought above the lower end of tube 20 but below the upper end of tube 17. The cover is then placed on the utensil in which water is to be boiled. The water in the cover is of such weight as to hold said cover firmly on the utensil so that it will not be lifted by the pressure of steam from within the utensil. Said utensil has been indicated at A. The steam generated in the utensil will flow upwardly through the tube 17 into the space above the water level. As its only means of escape is by way of the tube 20, the steam will be forced downwardly into the water in the cover and thus be condensed. Consequently, none of the steam with fumes from food being cooked will escape from the utensil.

The action of steam upon the water in body 1 will quickly raise the temperature of the water which can subsequently be withdrawn by pouring it through the tube 20 and used for any purpose desired.

Importance is attached to the fact that all of the parts of this device can be readily formed and assembled. By removing the bolts 14, the handle 13 and cap 11 can be removed, thereby giving access to the interior of the body 1 for the purpose of cleaning the same.

What is claimed is:

1. A cover for cooking utensils and the like, including a body constituting a water container, a steam outlet tube opening through the bottom of said body into the upper portion thereof, a water tube opening through the top of the body downwardly into the lower portion thereof, said body having an opening in the top thereof, a cap for closing the opening, and means extending upwardly within the body for detachably connecting the bottom of the body and the cap.

2. A cover for cooking utensils and the like, including a body constituting a water container, a steam outlet tube opening through the bottom of said body into the upper portion thereof, a water tube opening through the top of the body downwardly into the lower portion thereof, said body having an opening in the top thereof, a cap for closing the opening, a handle mounted on the cap, and means extending through the handle, cap and body for holding them assembled.

3. A cover for cooking utensils and the like including a body, a disk seated in the bottom portion thereof and forming a water-tight connection therewith, said body constituting a water container, a steam outlet tube secured to and extending through the disk and opening upwardly into the upper portion of the body, a water tube opening through the top of the body and downwardly into the lower portion thereof, there being an opening in the top of the body, a cap closing the opening, a handle seated in the cap, and a rod extending through the handle, cap and disk for holding them assembled with the body.

4. A condensing cover for cooking utensils and the like including a body having an annular flange at the bottom thereof and openings in the top thereof, a disk having an annular flange tightly seated in the bottom portion of the body, beads integral with the flanges of the disk and body, said beads being concentric and spaced apart and constituting means for receiving the edge of a cooking utensil or the like therebetween, a steam outlet tube carried by the disk and opening into the upper portion of the body, a water tube seated in one of the openings in the top of the body and opening downwardly into the body, a cap normally closing the other opening in the top of the body, a handle thereon, and means extending through the handle, cap and disk for holding them assembled with the body.

5. A condensing cover for cooking utensils and the like including a body having an annular flange at the bottom thereof, a disk having an annular flange seated tightly in the bottom portion of the body, beads at the edges of the flanges of the body and disk, said beads cooperating to receive between them the edge of a cooking utensil supporting the cover, a cap on the body, there being an opening in said body normally closed by the cap, a handle mounted on the cap, means extending through the handle, cap and disk for holding them assembled with the body, and means in the body for trapping steam.

6. A condensing cover for cooking utensils and the like including a hollow body constituting a water container, a tube opening into the upper portion of the body from the bottom thereof, a tube opening into the lower portion of the body from the top thereof, a closure for the top of the body, means within the body for detachably connecting the closure to the bottom of the body, and annular means on the body for engaging the top portion of a cooking utensil or the like to support said body and the weight of the contents thereof.

In testimony that I claim the foregoing as my own, I have hereto affixed my signature.

LAWRENCE HENRY TAYLOR.